US008888249B2

(12) United States Patent
Byun et al.

(10) Patent No.: US 8,888,249 B2
(45) Date of Patent: Nov. 18, 2014

(54) APPARATUS FOR JETTING DROPLET AND APPARATUS FOR JETTING DROPLET USING NANOTIP

(71) Applicant: Enjet Co., Ltd., Gyeonggi-do (KR)

(72) Inventors: Do Young Byun, Seoul (KR); Ji Hoon Kim, Gyeonggi-do (KR); Si Bui Quang Tran, Seoul (KR)

(73) Assignee: Enjet Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/147,637

(22) Filed: Jan. 6, 2014

(65) Prior Publication Data

US 2014/0118444 A1    May 1, 2014

Related U.S. Application Data

(62) Division of application No. 12/993,611, filed as application No. PCT/KR2008/004676 on Aug. 12, 2008, now Pat. No. 8,705,114.

(30) Foreign Application Priority Data

Jul. 9, 2008  (KR) .................. 10 2008 0066309
Jul. 9, 2008  (KR) .................. 10 2008 0066310

(51) Int. Cl.
*B41J 2/06*  (2006.01)
*B41J 2/035*  (2006.01)
*B82Y 15/00*  (2011.01)

(52) U.S. Cl.
CPC  *B41J 2/035* (2013.01); *B82Y 15/00* (2013.01); *B41J 2/06* (2013.01); *Y10S 977/902* (2013.01)
USPC .......................................... 347/55; 977/902

(58) Field of Classification Search
CPC ...... B41J 2/06; B41J 2002/061; B41J 2/4155; B41J 2/1433; B41J 2/1628; B41J 2/1631; B41J 2/162; B41J 2/1623; G03G 15/346; G03G 2217/0025
See application file for complete search history.

(56) References Cited

U.S. PATENT DOCUMENTS 3,941,312 A  *  3/1976  Ohno et al. .................. 239/696
6,158,844 A     12/2000  Murakami et al.
(Continued)

FOREIGN PATENT DOCUMENTS

JP    11 020169 A     1/1999
JP    2004114378 A    4/2004
(Continued)

OTHER PUBLICATIONS

Search Report for PCT/KR2008/004676, dated Apr. 8, 2009, 4 pages.

*Primary Examiner* — Lisa M Solomon
(74) *Attorney, Agent, or Firm* — Dority & Manning, P.A.

(57) ABSTRACT

The present invention provides a droplet jetting apparatus which jets fluid in a droplet shape. The apparatus includes a main body (100), which has a chamber (110) for containing fluid. The main body further has at least one nozzle (120) which communicates with the chamber and jets a droplet onto a printable matter, and a first electrode (130) which is formed on the inner surface of at least one selected from between the nozzle and the chamber by patterning treatment to make electrical contact with the fluid. The apparatus further includes a second electrode (140), which is provided between the nozzle and the printable matter and has a through hole, through which the droplet is jetted from the nozzle onto the printable matter, a power supply (200) which supplies a voltage applied between the first electrode and the second electrode, and a control unit (300) which controls the power supply.

26 Claims, 18 Drawing Sheets

(56) References Cited

U.S. PATENT DOCUMENTS 6,224,193 B1 5/2001 Minemoto et al.
2008/0036820 A1 2/2008 Yang et al.

FOREIGN PATENT DOCUMENTS

KR 20040065106 A 7/2004
KR 100596200 B1 6/2006

* cited by examiner

APPARATUS FOR JETTING DROPLET AND APPARATUS FOR JETTING DROPLET USING NANOTIP

CROSS REFERENCE TO RELATED APPLICATION

This application is a divisional of U.S. Ser. No. 12/993,611 with a filing date of Nov. 19, 2010, which is the national stage entry of International Patent Application No, PCT/KR2008/004676 having a filing date of Aug. 12, 2008, which claims the filing benefit of Korean Patent Application Numbers 10-2008-0066309 and 10-2008-0066310 having filing dates of Jul. 9, 2008.

TECHNICAL FIELD

The present invention relates, in general, to apparatuses for jetting droplets and apparatuses for jetting droplets using nanotips and, more particularly, to a droplet jetting apparatus which applies an electric field (electrostatic field) to the surface of fluid discharged from a nozzle, thus finely and efficiently jetting the fluid in a droplet shape, and a droplet jetting apparatus using a nanotip which applies an electric field (electrostatic field) to the surface of fluid discharged from a pointed end of the nanotip, thus finely and efficiently jetting the fluid in a droplet shape.

BACKGROUND ART

Generally, droplet jetting apparatuses for jetting (discharging) fluid in droplet shapes have been widely used in ink jet printers and recently are being developed to be applied to high value-added production industries, such as display production processing equipment, printed circuit board production processing equipment and DNA chip production processing equipment.

In ink jet printers, ink jetting apparatuses for jetting ink into droplet shapes are classified into a thermal-actuation type and an electrostatic type.

First, as shown in FIGS. 1 and 2, a thermal-actuation type ink jetting apparatus includes a manifold 22 which is provided on a base plate 10, an ink channel 24 and an ink chamber 26 which are defined by partitions 14 provided on the base plate 10, a heater 12 which is provided in the ink chamber 26, and a nozzle 16 which is formed in a nozzle plate 18 to jet an ink droplet 29'. A thermal-actuation type ink jetting apparatus having the above construction jets the ink droplet 29' through the following operation.

The heater 12 generates heat using voltage applied thereto. Ink 29 that is contained in the ink chamber 26 is heated by the heat, so that a bubble 28 is created.

The created bubble 28 is continuously expanded, thus applying pressure to the ink 29 contained in the ink chamber 26. Hence, a droplet 29' is jetted to the outside through the nozzle 26.

Thereafter, ink 29 is supplied from the manifold 22 into the ink chamber 26 through the ink channel 22, thus recharging the ink chamber 26.

However, in the thermal-actuation type ink jetting apparatus, ink 29 may be chemically deformed by heat generated from the heater 12 for the purpose of creating bubbles, with the result that the quality of the ink 29 deteriorates.

Furthermore, while a droplet 29' of ink jetted from the nozzle 16 moves towards the material to be printed on, such as paper, the droplet 29' may rapidly vary in volume due to the heat of the heater 12, thus reducing the printing quality, for example, reducing the resolution.

In addition, the thermal-actuation type ink jetting apparatus is problematic in that it is very difficult to minutely control, for example, the shape and size of the droplet 29' jetted from the nozzle 16.

As well, due to the above-mentioned problems, it is not easy to realize a highly integrated droplet jetting apparatus.

Meanwhile, FIGS. 3 and 4 illustrate an electrostatic droplet jetting apparatus which uses an electric field, unlike the above droplet jetting apparatus.

As shown in FIGS. 3 and 4, the electrostatic droplet jetting apparatus includes a base electrode 32 and an opposite electrode 33 which face each other. Ink 31 is injected between the two electrodes 32 and 33. A DC power supply 34 is connected to the two electrodes 32 and 33.

When voltage is applied to the electrodes 32 and 33 by the DC power supply 34, an electrostatic field is formed between the two electrodes 32 and 33.

Then, Coulomb's force is applied to the ink 31 in the direction toward the opposite electrode 33.

Meanwhile, because of the surface tension and viscosity of the ink, a force repulsive to Coulomb's force is generated on the ink 31, so that the ink 31 is not easily jetted towards the electrode 33.

Therefore, to separate a droplet from the surface of the ink 31 and jet the droplet, a relatively high voltage, for example, 1 kV or more, must be applied between the electrodes 32 and 33.

Furthermore, if high voltage is not applied between the electrodes 32 and 33, droplets are irregularly jetted and a certain portion of the ink 31 is partially heated.

In detail, a temperature T1 of ink 31' in an area S1 becomes higher than a temperature T0 of ink 31 in an area other than the area S1. Thus, the ink 31' in the area S1 is expanded and the electrostatic field is focused on this area, so that lots of electrons collect there.

Therefore, repulsive force applied between electrons and Coulomb's force attributable to the electrostatic field are applied to the ink 31' in the area S1. Thus, as shown in FIG. 4, a droplet is separated from the ink 31' in the area S1 and moves towards the opposite electrode 33.

However, the electrostatic droplet jetting apparatus having the above-mentioned construction is problematic in that very high voltage, for example, 1 kV or more, must be applied to the electrodes 32 and 33 and the separate opposite electrode 33 must be provided at a position facing the nozzle. Furthermore, there is a technical limit in the realization of nano-scale patterning, which has been recently regarded as important. Recently, as the size of a device is reduced from a micro-scale to a nano-scale level, the manufacture of a nano-scale structure becomes more important. As the results of research into printing techniques for patterning nano-scale structures, there have resulted an atomic-force microscope (AFM) based method, a nanopipet deposition method, a beam-based method, a contact printing method and an electric radiation method. The above-mentioned methods make nano-scale patterning possible, but there are disadvantages in that the speed of the patterning is relatively slow and they cannot be used to pattern over a large area. Hence, a rapid printing technique that can conduct patterning in both micro- and nano-scale is required.

DISCLOSURE

Technical Problem

Accordingly, the present invention has been made keeping in mind the above problems occurring in the prior art, and an object of the present invention is to provide a droplet jetting apparatus which applies a controllable electrostatic field to the surface of fluid discharged from a nozzle, thus jetting the fluid in a droplet shape without causing thermal deformation, and which can minutely control the jetted droplet using a first electrode, a second electrode and a third electrode, and to provide a droplet jetting apparatus using a nanotip which applies a controllable electrostatic field to the surface of fluid discharged from the nanotip, thus jetting the fluid in a droplet shape without causing thermal deformation, and which can minutely control the jetted droplet using a first, second and third electrode.

Technical Solution

In an aspect, the present invention provides an apparatus for jetting a droplet onto a first surface of a printable matter, comprising: a main body having a chamber for containing therein a predetermined amount of fluid, including liquid and particles supplied from an outside, at least one nozzle for communicating with the chamber, the nozzle jetting a droplet of the fluid contained in the chamber onto the first surface of the printable matter, and a first electrode formed on an inner surface of at least one selected from between the nozzle and the chamber by patterning treatment to make electrical contact with the fluid; a second electrode provided between the nozzle and the printable matter, the second electrode having therein a through hole through which the droplet is jetted from the nozzle onto the first surface of the printable matter; a power supply to supply a voltage applied between the first and second electrodes; and a control unit to control the power supply.

The main body may include an upper plate and a lower plate which are attached to each other, wherein the lower plate may have on an upper surface thereof: a rectangular depression for defining the chamber; a longitudinal groove extending from the rectangular depression to a front surface of the lower plate to form the nozzle; and a supply hole formed in the rectangular depression and extending to a lower surface of the lower plate for supplying the fluid from the outside into the chamber.

The apparatus may further comprise a third electrode disposed at a position spaced apart from a second surface of the printable matter by a predetermined distance.

The power supply may supply a voltage to be applied between the first electrode and the third electrode.

The second electrode may be formed by alternately placing electrode layers and insulation layers on top of one another.

The control unit may individually control a voltage applied between the first electrode and each of the electrode layers of the second electrode.

The voltage applied between the first electrode and the second electrode may comprise one selected from among a DC-pulse voltage, an AC voltage and a combination of a DC voltage and an AC voltage.

Furthermore, an end of the nozzle may protrude outwards from the main body.

In addition, a hydrophobic film may be applied to a surface of the end of the nozzle.

Preferably, the main body may be made of a polymer material.

The nozzle may comprise a plurality of nozzles formed in the main body, the nozzles communicating with the single chamber.

In another aspect, the present invention provides an apparatus for jetting a droplet, comprising: a first electrode provided adjacent to a first surface of a printable matter to make electrical contact with fluid; and a second electrode provided adjacent to the first surface or a second surface of the printable matter, the second electrode forming an electrostatic field along with the first electrode to jet a droplet onto the first surface of the printable matter, wherein a voltage applied between the first electrode and the second electrode comprises one selected from among a DC-pulse voltage, an AC voltage and a combination of a DC voltage and an AC voltage.

In another aspect, the present invention provides an apparatus for jetting a droplet using a nanotip onto a first surface of a printable matter, comprising: a main body including a cantilever having a nanoplate and a nanoplate provided under a lower surface of a first end of the nanoplate, a horizontal open channel extending from a chamber, formed in a second end of the nanoplate, to the first end of the nanoplate along an upper surface of the nanoplate so that fluid contained in the chamber is moved to the first end of the nanoplate through the horizontal open channel, a vertical open channel formed in one surface of the nanotip such that a first end thereof communicates with the horizontal open channel and a second thereof extends to a pointed end of the nanotip so that the fluid that is moved to the first end of the nanoplate is moved to the pointed end of the nanotip through the vertical open channel, and a first electrode provided on at least one predetermined portion to make electrical contact with the fluid; a second electrode provided between the pointed end of the nanotip and the printable matter, the second electrode having therein a through hole, through which a droplet of the fluid is jetted from the pointed end onto the first surface of the printable matter; a power supply to supply a voltage to be applied between the first electrode and the second electrode; and a control unit to control the power supply.

The apparatus may further comprise a third electrode disposed at a position spaced apart from a second surface of the printable matter by a predetermined distance.

The power supply may supply a voltage to be applied between the first electrode and the third electrode.

The second electrode may be formed by alternately placing electrode layers and insulation layers on top of one another.

The control unit may individually control a voltage applied between the first electrode and each of the electrode layers of the second electrode.

The voltage applied between the first electrode and the second electrode may comprise one selected from among a DC-pulse voltage, an AC voltage and a combination of a DC voltage and an AC voltage.

Furthermore, a hydrophobic film may be applied to a surface of the pointed end of the nanotip.

The cantilever may be made of a polymer material.

The main body may comprises a plurality of main bodies provided adjacent to each other to form an integrated structure, and the second electrode may be provided between the printable matter and the pointed ends of the main bodies, with through holes formed in the second electrode at respective positions corresponding to the pointed ends of the main bodies.

In another aspect, the present invention provides an apparatus for jetting a droplet using a nanotip onto a first surface of a printable matter, comprising: a main body including a cantilever having a nanoplate and a nanoplate provided under a lower surface of a first end of the nanoplate, a horizontal open channel extending from a chamber, formed in a second end of the nanoplate, to the first end of the nanoplate along an upper surface of the nanoplate so that fluid contained in the chamber is moved to the first end of the nanoplate through the horizontal open channel, a vertical closed channel formed through the nanotip in a vertical direction such that a first end thereof communicates with the horizontal open channel and a second thereof extends to a pointed end of the nanotip so that the fluid that is moved to the first end of the nanoplate is moved to the pointed end of the nanotip through the vertical closed channel, and a first electrode provided on at least one predetermined portion for making electrical contact with the fluid; a second electrode provided between the pointed end of the nanotip and the printable matter, the second electrode having therein a through hole, through which a droplet of the fluid is jetted from the pointed end onto the first surface of the printable matter; a power supply to supply a voltage to be applied between the first electrode and the second electrode; and a control unit to control the power supply.

The apparatus may further comprise a third electrode disposed at a position spaced apart from a second surface of the printable matter by a predetermined distance.

The power supply may supply a voltage to be applied between the first electrode and the third electrode.

The second electrode may be formed by alternately placing electrode layers and insulation layers on top of one another.

The control unit may individually control a voltage applied between the first electrode and each of the electrode layers of the second electrode.

The voltage applied between the first electrode and the second electrode may comprise one selected from among a DC-pulse voltage, an AC voltage and a combination of a DC voltage and an AC voltage.

Furthermore, a hydrophobic film may be applied to a surface of the pointed end of the nanotip.

The cantilever may be made of a polymer material.

The main body may comprise a plurality of main bodies provided adjacent to each other to form an integrated structure, and the second electrode may be provided between the printable matter and the pointed ends of the main bodies, with through holes formed in the second electrode at respective positions corresponding to the pointed ends of the main bodies.

In another aspect, the present invention provides an apparatus for jetting a droplet using a nanotip onto a first surface of a printable matter, comprising: a main body including a nanoplate having a pointed end formed by reducing a width of a first end of the nanoplate, a horizontal open channel extending from a chamber, formed in a second end of the nanoplate, to the first end of the nanoplate along an upper surface of the nanoplate so that fluid contained in the chamber is moved to the pointed end of the first end of the nanoplate through the horizontal open channel, and a first electrode provided on a portion of the horizontal open channel for making electrical contact with the fluid; a second electrode provided between the pointed end of the nanoplate and the printable matter, the second electrode having therein a through hole, through which a droplet of the fluid is jetted from the pointed end of the nanoplate onto the first surface of the printable matter; a power supply to supply a voltage to be applied between the first electrode and the second electrode; and a control unit to control the power supply.

The apparatus may further comprise a third electrode disposed at a position spaced apart from a second surface of the printable matter by a predetermined distance.

The power supply may supply a voltage to be applied between the first electrode and the third electrode.

The second electrode may be formed by alternately placing electrode layers and insulation layers on top of one another.

The control unit may individually control a voltage applied between the first electrode and each of the electrode layers of the second electrode.

The voltage applied between the first electrode and the second electrode may comprise one selected from among a DC-pulse voltage, an AC voltage and a combination of a DC voltage and an AC voltage.

Furthermore, a hydrophobic film may be applied to a surface of the pointed end of the nanoplate.

The nanoplate may be made of a polymer material.

The nanoplate may comprise a plurality of nanoplates provided adjacent to each other to form an integrated structure, and the second electrode may be provided between the printable matter and the pointed ends of the nanoplates, with through holes formed in the second electrode at respective positions corresponding to the pointed ends of the nanoplates.

Figure 1:
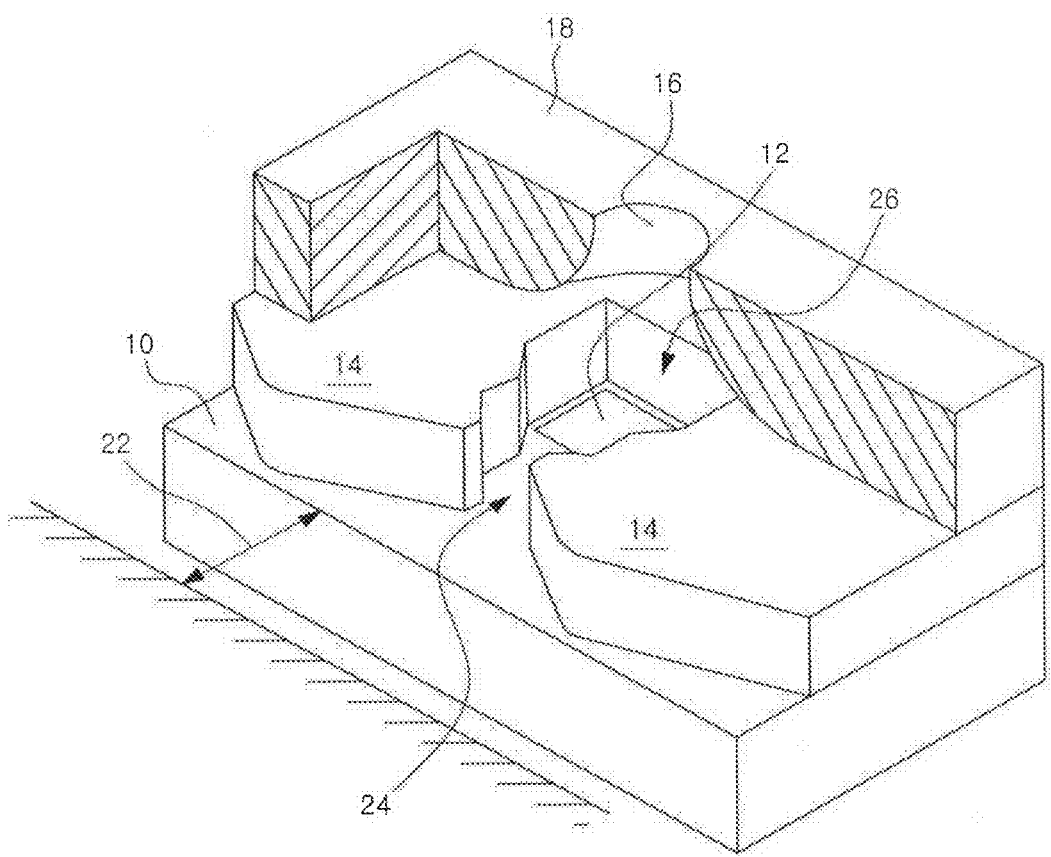
FIGS. 1 and 2 are views showing a thermal-actuation type droplet jetting apparatus according to a conventional technique.
Figure 2:
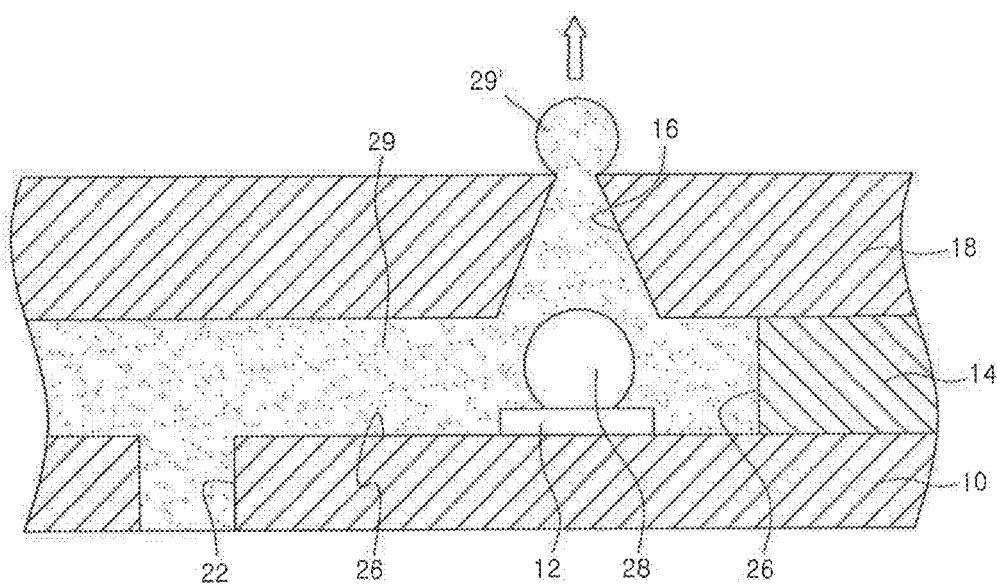
Figure 3:
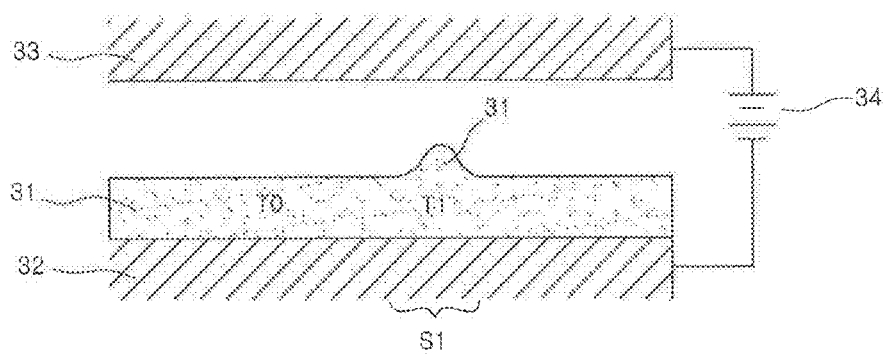
FIGS. 3 and 4 are views showing an electrostatic droplet jetting apparatus according to another conventional technique.
Figure 4:
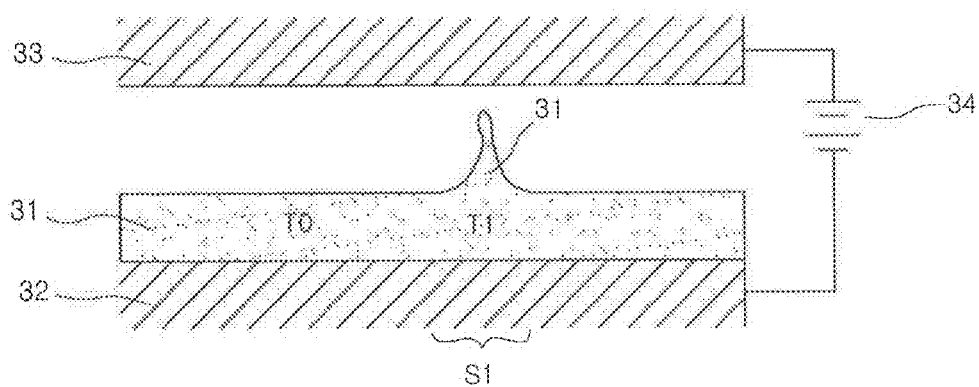

| | |
|---|---|
| 100: main body | 100a: upper plate |
| 100b: lower plate | 110: chamber |
| 120: nozzle | 130: first electrode |
| 140: second electrode | 142: electrode layer |

-continued

<Description of the elements in the drawings>

| | |
|---|---|
| 144: insulation layer | 150: third electrode |
| 200: power supply | 300: control unit. |
| 400: main body | 410: first electrode |
| 420: second electrode | 420h: through hole |
| 422: electrode layer | 424: insulation layer |
| 430: third electrode | 440: cantilever |
| 442: nanoplate | 444: nanotip |
| 444a: pointed end | |
| 450: horizontal open channel | |
| 460: vertical open channel | |
| 460': vertical closed channel | |
| 500: power supply | 600: control unit |

BEST MODE

Hereinafter, preferred embodiments of the present invention will be described in detail with reference to the attached drawings.

A better understanding of the present invention may be obtained through the following embodiments, which are set forth to illustrate, but are not to be construed as limiting the present invention.

First Embodiment

Figure 6:
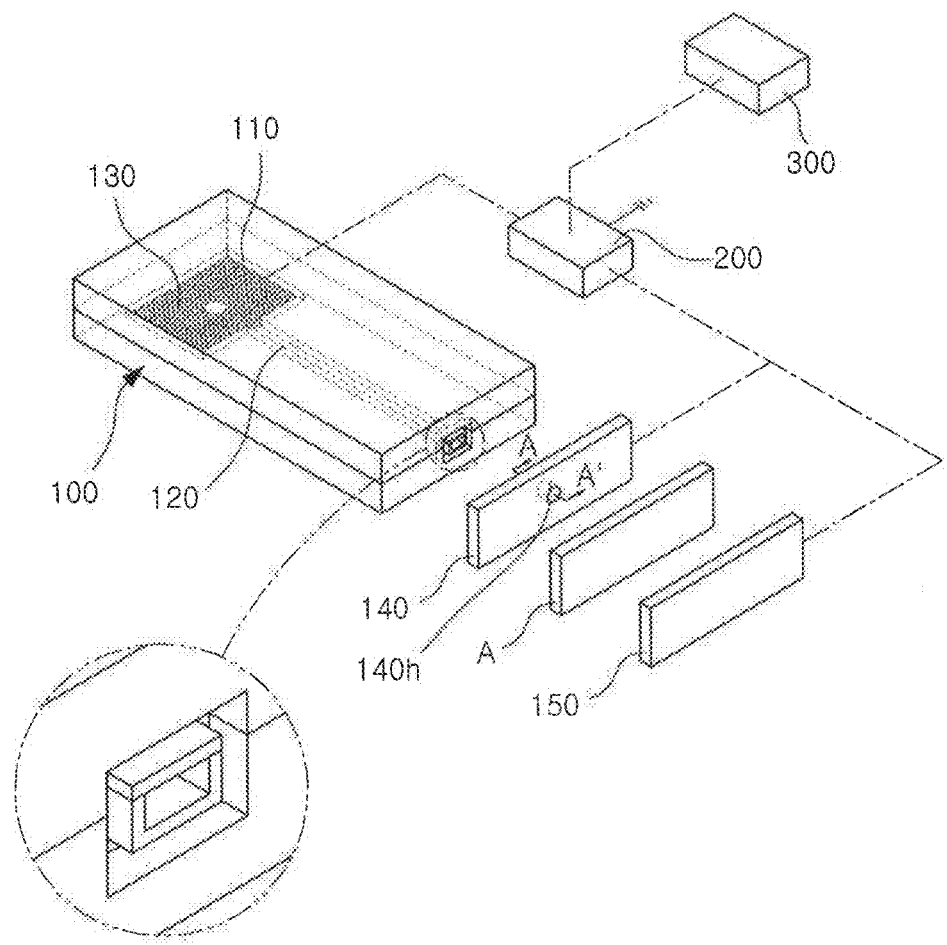
FIG. 6 is a view showing the droplet jetting apparatus of FIG. 5.

As shown in FIG. 6, an apparatus for jetting a droplet according to a first embodiment of the present invention includes a main body 100 provided with a first electrode 130, a second electrode 140, a third electrode 150, a power supply 200 and a control unit 300.

The main body has a chamber 110 therein and includes a nozzle 120 and the first electrode 130. The chamber 110 functions to contain therein a predetermined amount of fluid including liquid and particles supplied from the outside. The nozzle 120 communicates with the chamber 110 and functions to jet a droplet of the fluid, contained in the chamber 110, to a first surface of printable matter A. The first electrode 130 is formed on the inner surface of at least one of the chamber 110 and the nozzle 120 by patterning treatment to make electrical contact with the fluid.

The second electrode 140 is provided between the nozzle 120 and the printable matter A and has therein a through hole 140h, through which a droplet is jetted from the nozzle 120 to the first surface of the printable matter A. The power supply 200 supplies voltage applied between the first electrode 130 and the second electrode 140. The control unit 300 controls the power supply 200. The third electrode 150 is disposed at a position spaced apart from a second surface of the printable matter A by a predetermined distance.

First, the main body 100 will be explained in detail below.

Figure 5:
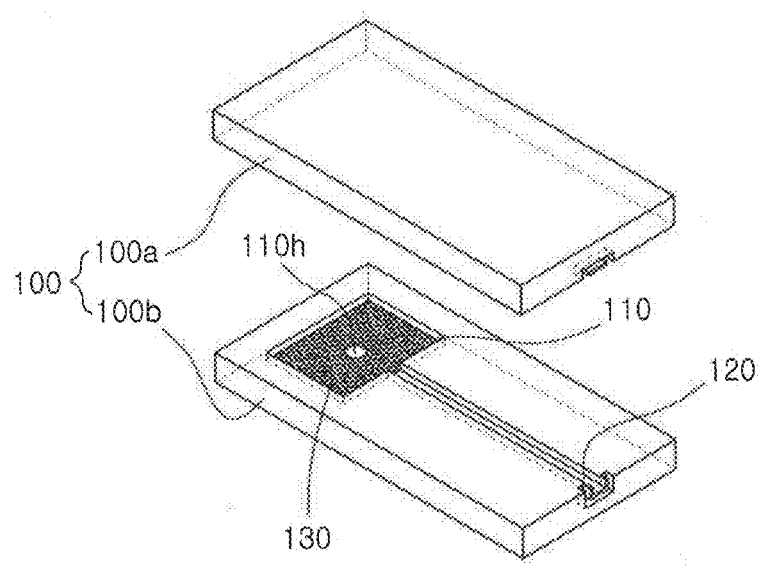
FIG. 5 is a perspective view of a main body of an apparatus for jetting a droplet having a single nozzle, according to a first embodiment of the present invention.

As shown in FIGS. 5 and 6, the main body 100 has the chamber 110, which contains therein a predetermined amount of fluid including liquid and particles supplied from the outside. The main body 100 includes the nozzle 120 which communicates with the chamber 110 and jets a droplet of the fluid, contained in the chamber 110, to the first surface of the printable matter A, and the first electrode 130 which is formed on the inner surface of the chamber 110 by patterning treatment to make electrical contact with the fluid.

As one example, the main body 100 may comprise an upper plate 100a, and a lower plate 100b which is attached at the upper surface thereof to the lower surface of the upper plate 100a, as shown in FIG. 5. A rectangular depression is formed in the upper surface of the lower plate 100b to define the chamber 110 between the upper and lower plates 100a and 100b which are attached to each other. Furthermore, a longitudinal groove which extends from the rectangular depression to the front surface of the lower plate 100b is formed in the upper surface of the lower plate 100b to form the nozzle 120 between the upper and lower plates 100a and 100b. A supply hole 100h, through which fluid is supplied from the outside into the chamber 110, is formed in the rectangular depression and extends to the lower surface of the lower plate 100b.

Figure 9:
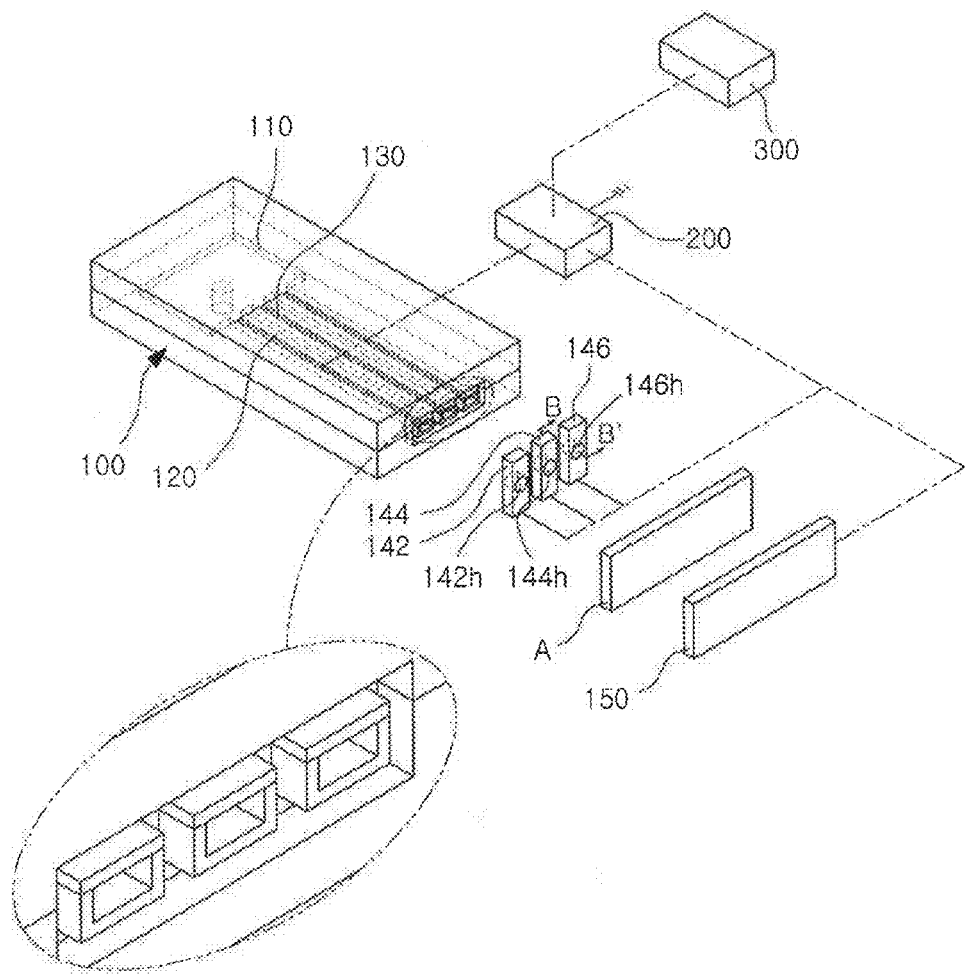
FIG. 9 is a view showing the droplet jetting apparatus of FIG. 8.

As shown in FIGS. 6 and 9, when the nozzle 120 is formed by attaching the lower surface of the upper plate 100a to the upper surface of the lower plate 100b, the end of the nozzle 120 preferably protrudes outwards from the main body 100. Because of this shape made such that the end of the nozzle 120 protrudes outwards from the main body 100, a relatively large contact angle can be maintained when a liquid surface of fluid is formed, thus increasing the stability of the liquid surface.

Figure 11:
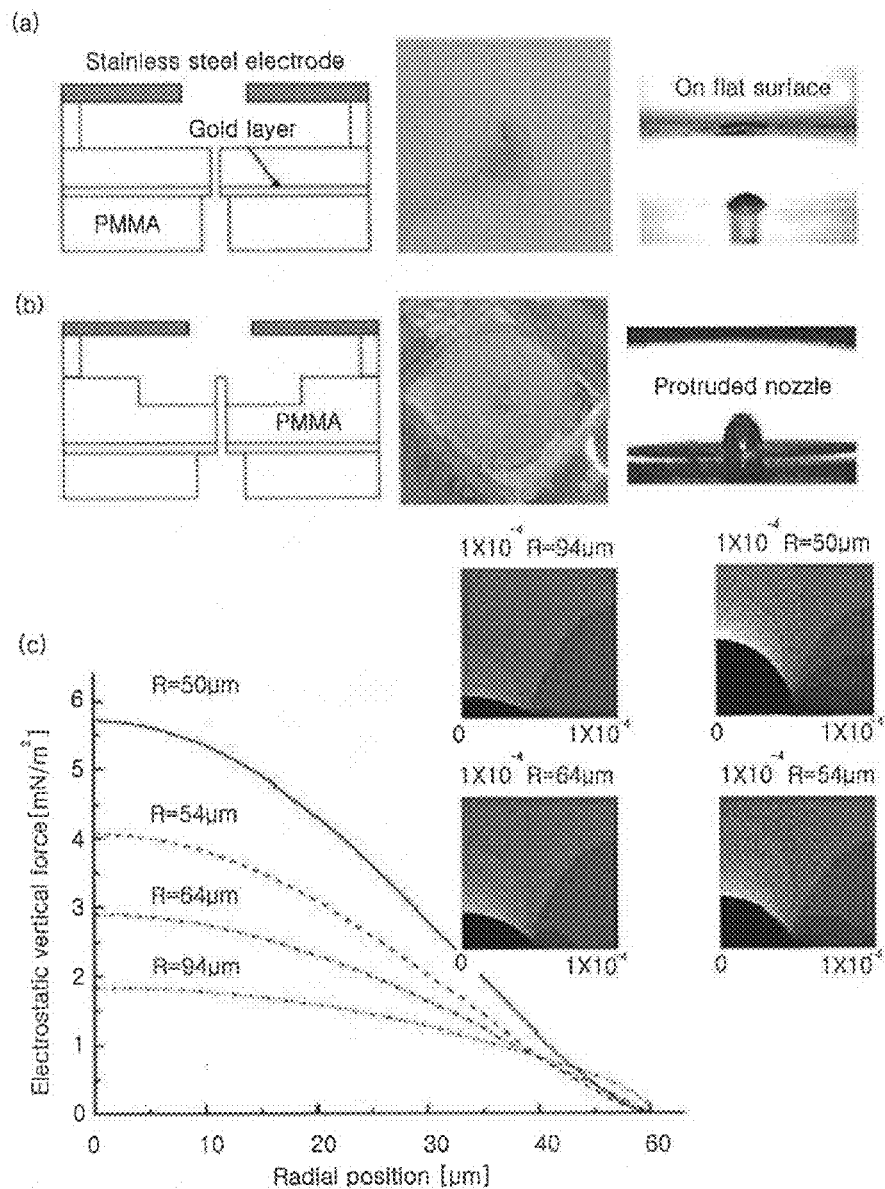
FIG. 11 is of views illustrating an effect of a protruded nozzle of the droplet jetting apparatus according to the first embodiment of the present invention.

FIG. 11 shows a difference between a liquid surface formed on an apparatus (a) having a nozzle formed by simply boring and a liquid surface formed on an apparatus (b) having a protruded nozzle. In addition, FIG. 11 shows distribution of an electric field depending on the shape of a liquid surface. As a curvature radius R of the liquid surface becomes smaller, the shape of the liquid surface comes closer to a hemispheric shape. It is to be understood that as the curvature radius R of the liquid surface becomes smaller, the intensity of the electric field becomes increased and the electric field is focused on the center thereof. Therefore, it is to be appreciated that the protruded nozzle provides many advantages in the jetting of a droplet.

Furthermore, a hydrophobic film may be applied to the surface of the end of the nozzle 120. For example, a hydrophobic surface can be formed by oxygen plasma treatment or argon and oxygen ion beam treatment. As such, in the case where the hydrophobic film is applied to the surface of the end of the nozzle 120, when a droplet is jetted from the nozzle 120, the initial meniscus of fluid can be effectively formed. In addition, even though droplets be repeatedly jetted, the jetting operation can be reliably conducted and the performance thereof can be increased.

Figure 8:
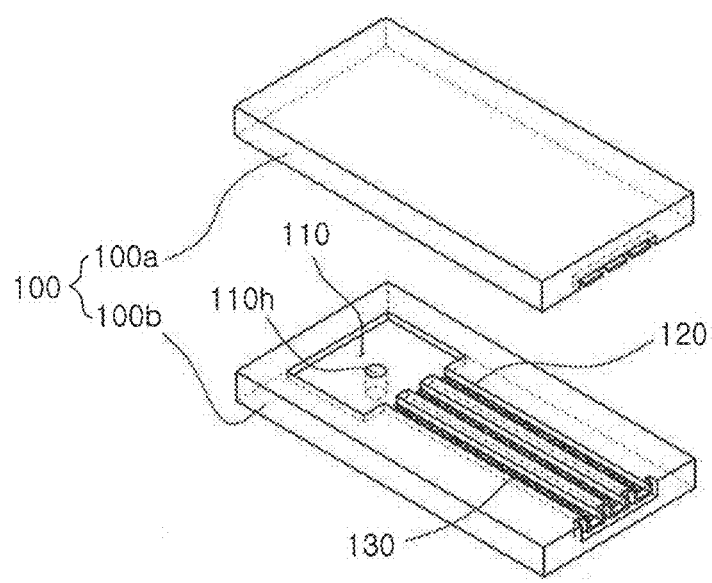
FIG. 8 is a perspective view of a main body of an apparatus for jetting a droplet having multiple nozzles, according to the first embodiment of the present invention.

Meanwhile, as shown in FIGS. 8 and 9, several nozzles 120 may be formed in the main body 100 and extend from the single chamber 110. In detail, a single rectangular depression is formed in the upper surface of the lower plate 100b to form the chamber 110 therein, and three longitudinal grooves which extend from the rectangular depression to the front surface of the lower plate 100b are formed in the upper surface of the lower plate 100b to form three nozzles 120. A supply hole 100h, through which fluid is supplied from the outside into the chamber 110, is formed in the rectangular depression and extends to the lower surface of the lower plate 100b.

Here, although the first electrode 130 has been illustrated in the description of FIG. 5 as being formed in the inner surface of the chamber 110 by patterning to make electrical contact with fluid, first electrodes 130 may be formed in the inner surfaces of the respective nozzles 120 by patterning treatment to make electrical contact with fluid, as shown in FIG. 8. Such a first electrode 130 may also be formed on the lower surface of the upper plate 100a.

Preferably, the main body 100 is made of polymer material. In particular, in the case where several droplet jetting apparatuses are arranged such that they are close to each other or, as shown in FIG. 8, several nozzles 120 are connected to the single chamber 110, if the main body 100 is made of nonconductive polymer material, electrical interference occurring between the droplet jetting apparatuses or between the nozzles 120 can be prevented.

The main body 100 may be manufactured by a PDMS (polydimethylsiloxane) molding method.

Next, the second electrode 140 and the third electrode 150 will be explained in detail below.

As shown in FIGS. 5 and 6, the second electrode 140 is provided between the nozzle 120 of the main body 100 and the printable matter A. The through hole 140h, through which a droplet jetted from the nozzle 120 is applied to the first surface of the printable matter A, is formed through the second electrode 140.

When the power supply 200 which will be explained later provides voltage applied between the second electrode 140 and the first electrode 130 of the main body 100, fluid that has been supplied into the chamber 110 is jetted through the nozzle 120 and then printed onto the printable matter A after passing through the through hole 140h. In detail, when voltage is applied between the first electrode 130 and the second electrode 140, an electrostatic field is formed between the first electrode 130 and the second electrode 140, and Coulomb's force is applied to the fluid in the direction toward the second electrode 140 which is an opposing electrode. Hence, a droplet is jetted onto the printable matter A through the nozzle 120.

Figure 7:
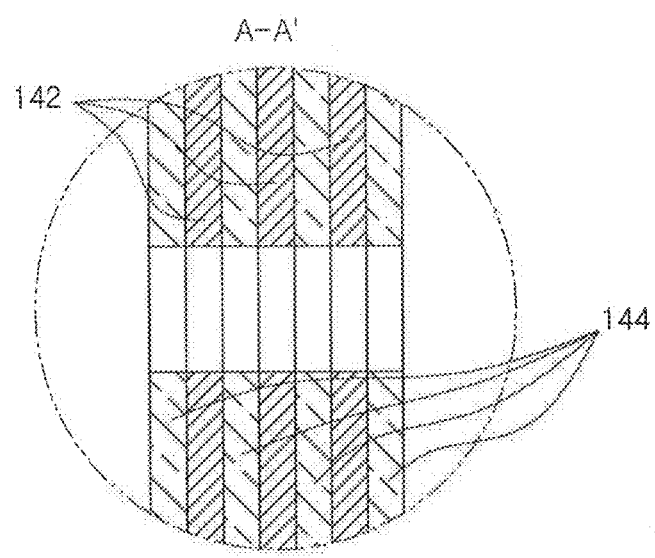
FIG. 7 is a sectional view taken along the line A-A' of FIG. 6.
Figure 10:
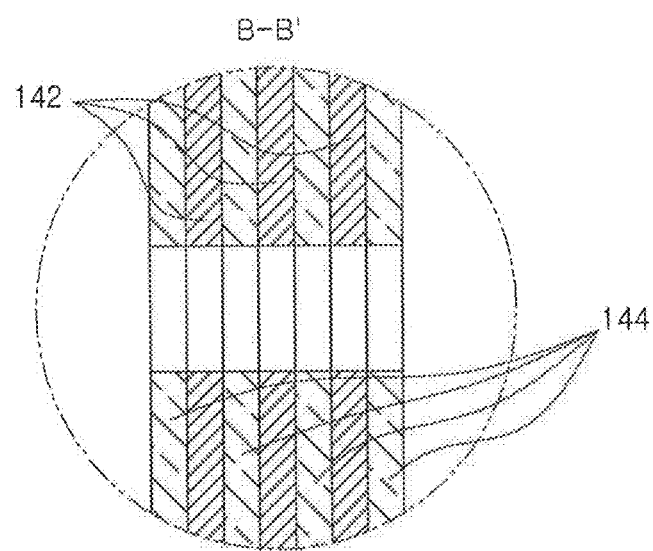
FIG. 10 is a sectional view taken along the line B-B' of FIG. 9.

Here, as shown in FIGS. 7 and 10, the second electrode 140 is formed by alternately placing electrode layers 142 and insulation layers 144 on top of one another. Voltage which is applied between the first electrode 130 and each electrode layer 142 of the second electrode 140 can be individually controlled by the control unit 300. This, will be explained in detail in the description of the power supply 200 and the control unit 300.

Meanwhile, as shown in FIGS. 8 and 9, in the case of the main body 100 in which the several nozzles 120 are connected to a single chamber 110 of the main body 100, second electrodes 140 are provided at positions corresponding to the respective nozzles 120, such that voltage which is applied between the first electrode 130 and each second electrode 140 can be individually controlled.

As shown in FIGS. 5, 6, 8 and 9, the third electrode 150 is disposed at a position spaced apart from the second surface of the printable matter A by a predetermined distance. Voltage is also applied between the first electrode 130 and the third electrode 150. As such, because voltage is also applied between the first electrode 130 and the third electrode 150, Coulomb's force is further increased so that straightness of the trajectory of the jetted droplet can be further enhanced.

Next, the power supply 200 and the control unit 300 will be explained in detail.

As shown in FIGS. 6 and 9, the power supply 200 supplies a voltage to be applied between the first electrode 130 and the second electrode 140 and between the first electrode 130 and the third electrode 150. The control unit 300 controls the power supply 200.

As stated above, the control unit 300 individually controls voltage applied between the first electrode 130 and each electrode layer 142. Furthermore, the control unit 300 can also independently control voltage applied between the first electrode 130 and the second electrode 140 while individually controlling voltage applied between the first electrode 130 and each electrode layer 142.

For example, when voltage applied between the first electrode 130 and an electrode layer 142 disposed nearest to the nozzle 120 is different from the voltage applied between the first electrode 130 and an electrode layer 142 disposed farthest from the nozzle 120, the acceleration of the jetted droplet can be varied to be increased or decreased. Depending on variation in the acceleration of jetted droplet, the quality of the print on the printable matter A also varies. In other words, a pattern formed may vary depending on: the impact force with which a droplet strikes the printable matter A. In the case of patterning in applied fields, such as a display, RFID, solar cell, etc., and not simple letter printing, there may be a difference in performance depending on the uniformity of a line or waveness. Therefore, a precise control for preventing this is required. If the velocity of jetted droplet is controlled, optimal printing can be expected.

Meanwhile, voltage applied between the first electrode 130 and the second electrode 140 may comprise one selected from among DC-pulse voltage, AC voltage or a combination of DC and AC voltage.

When electric charges are electrically charged on the interface of fluid by the consecutive application of signals of DC voltage and the electric charges move in the tangential direction of the interface, electrostatic force is concentrated on the central portion of the interface, thus jetting a droplet. However, because the interface and a jetting mode vary depending on the level of applied voltage and the electrical conductivity, the surface tension coefficient or the viscosity of fluid, if consecutive signals are applied, only under the restrictive condition that a single droplet be formed can droplets be formed and jetted.

To overcome this, if DC voltage is applied, because electrostatic force is applied to the interface of a droplet only for a limited time, a desired number of droplets can be formed and jetted at desired point in time. In the case of continuous jet or cone-jet, a droplet can also be formed by cutting the continuous jet. However, even in this case, to effectively form a droplet, the conditions, such as the applied voltage, must be optimally given depending on the physical characteristics of the fluid. In other words, optimal voltage and frequency pulse must be applied depending on the characteristics of the fluid such that a desired number of droplets are formed at a desired point in time.

Meanwhile, according to recent research of electrospray, it is reported that the interface of fluid can also be changed by AC voltage. Therefore, in the first embodiment of the present invention, it is proposed to form and jet a droplet using AC voltage.

Moreover, to enhance the efficiency and effect of forming and jetting a droplet, preferably, DC voltage is applied within a range in which fluid is not sprayed or a droplet is not formed and, simultaneously, AC voltage of a special frequency is applied. Then, droplets can be formed and jetted a number of times proportional to the corresponding frequency, and more reliable optimal conditions can be given.

Second Embodiment and Third Embodiment

Figure 12:
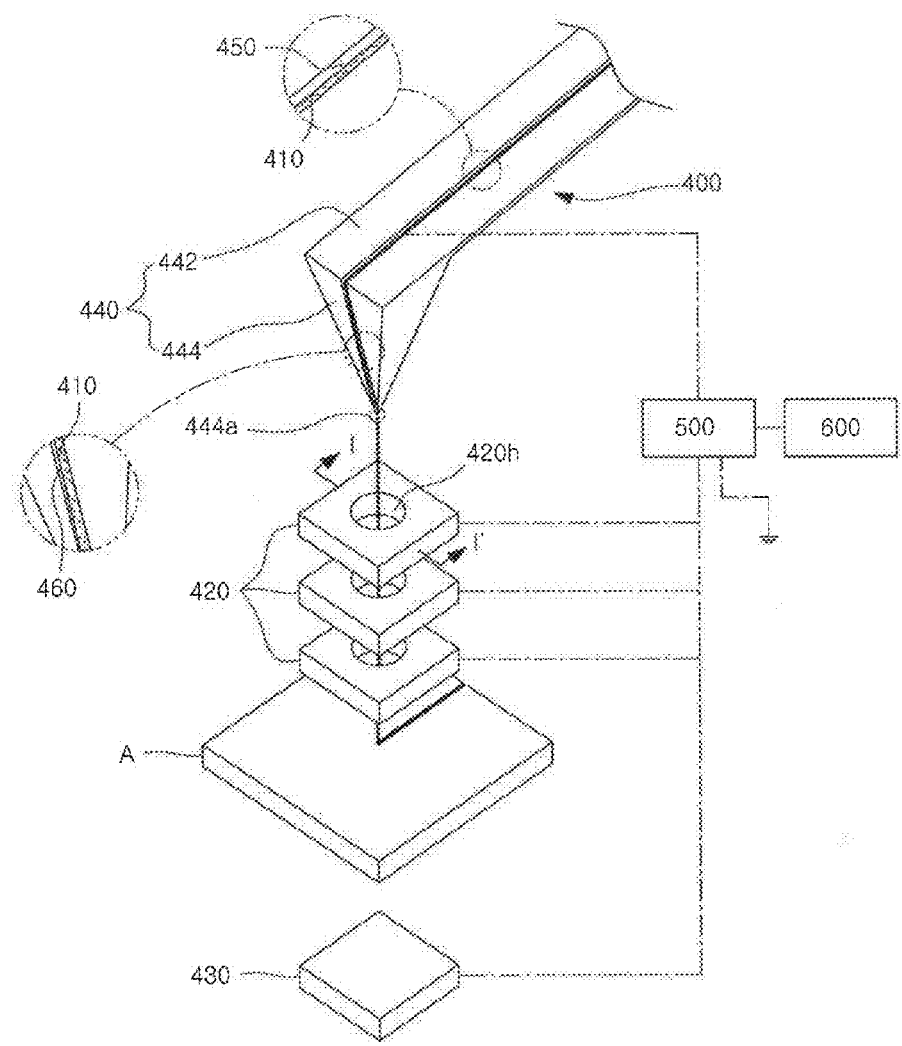
FIG. 12 is a view showing an apparatus for jetting a droplet using a nanotip, according to a second embodiment of the present invention.
Figure 14:
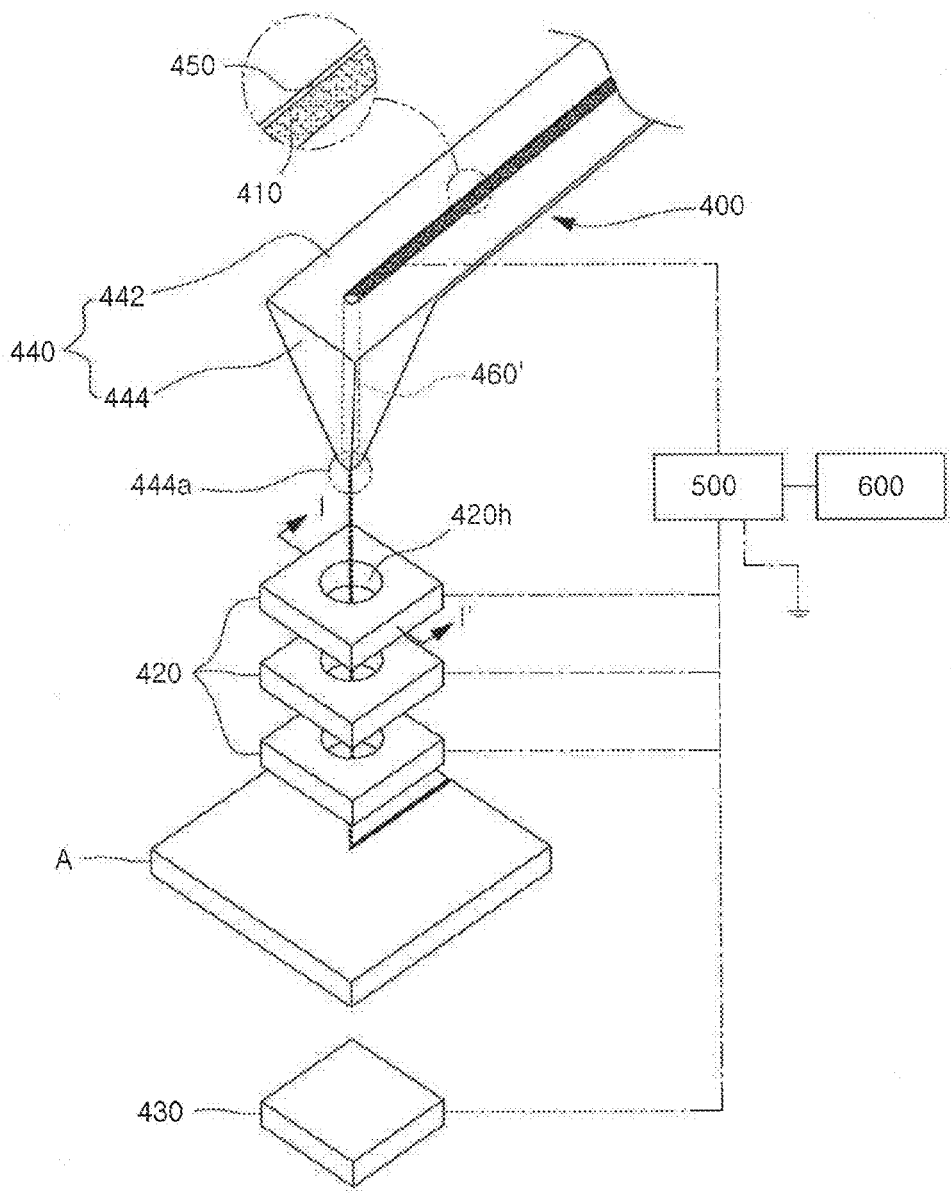
FIG. 14 is a view showing an apparatus for jetting a droplet using a nanotip, according to a third embodiment of the present invention.

As shown in FIG. 12 or 14, an apparatus for jetting a droplet using a nanotip according to a second or a third embodiment of the present invention includes a main body 400 provided with a first electrode 410, a second electrode 420, a third electrode 430, a power supply 500 and a control unit 600.

The main body 400 includes a cantilever 440, a horizontal open channel 450, a vertical open channel 460 and the first electrode 410. The cantilever 440 includes a nanoplate 442 and a nanotip 444, which is provided under the lower surface of a first end of the nanoplate 442. The horizontal open channel 450 extends from a chamber (C of FIG. 15), which is formed in a second end of the nanoplate 442, to the first end of the nanoplate 442 along the upper surface of the nanoplate 442. Fluid which is contained in the chamber C is moved to the first end of the nanoplate 442 through the horizontal open channel 450. The vertical open channel 460 is formed in one surface of the nanotip 444 such that a first end thereof communicates with the horizontal open channel 450 and a second thereof extends to a pointed end 444a of the nanotip 444. Thus, the fluid that is moved to the first end of the nanoplate 442 is moved to the pointed end 444a of the nanotip 444 through the vertical open channel 460. The first electrode 410 is provided to make electrical contact with fluid.

The second electrode 420 is provided between the pointed end 444a of the nanotip 444 and the printable matter A and has therein a through hole 420h, through which a droplet is jetted from the pointed end 444a to the first surface of the printable matter A. The power supply 500 supplies voltage applied between the first electrode 410 and the second electrode 420. The control unit 600 controls the power supply 500. The third electrode 430 is disposed at a position spaced apart from a second surface of the printable matter A by a predetermined distance.

Here, a vertical closed channel 460' may be provided in place of the vertical open channel 460. In this case, the horizontal open channel 450 extends from the chamber C of the second end of the nanoplate 442 to the first end of the nanoplate 442 along the upper surface of the nanoplate 442, and the vertical closed channel 460' is vertically formed through the nanotip 444 such that a first end thereof communicates with the horizontal open channel 450 and a second end thereof extends to the nanotip 444a of the nanotip 444.

First, the main body 400 will be explained in detail.

The main body 400 according to the second embodiment includes a cantilever 440, which has a nanoplate 442 and a nanotip 444 that is provided under the lower surface of a first end of the nanoplate 442. The main body 400 has a horizontal open channel 450, which extends from a chamber C that is formed in a second end of the nanoplate 442 to the first end of the nanoplate 442 along the upper surface of the nanoplate 442 so that fluid which is contained in the chamber C is moved to the first end of the nanoplate 442 through the horizontal open channel 450. The main body 400 further has a vertical open channel 460 which is formed in one surface of the nanotip 444 such that a first end thereof communicates with the horizontal open channel 450 and a second thereof extends to a pointed end 444a of the nanotip 444 so that the fluid that is moved to the first end of the nanoplate 442 is moved to the pointed end 444a of the nanotip 444 through the vertical open channel 460. The main body 400 further includes a first electrode 410 which is provided at at least one predetermined position for making electrical contact with the fluid.

As shown in FIG. 12, in the cantilever 440 of the main body 400 according to the second embodiment, for example, the horizontal open channel 450 may be formed by forming a groove in the upper surface of the nanoplate 442 along the longitudinal center axis of the nanoplate 442. The vertical open channel 460 may be formed by forming a groove in the surface of the nanotip 444 along the longitudinal center axis of the nanotip 444 such that the groove of the nanotip 444 is connected to the groove the nanoplate 442.

The first electrode 410 is formed on the inner surfaces of the horizontal open channel 450 and the vertical open channel 460 by patterning treatment. Here, the first electrode 410 may be formed in one selected from between the horizontal open channel 450 and the vertical open channel 460. Alternatively, the main body 400 may be made of conductive material and thus itself may be used as the first electrode 410.

In the case where the first electrode 410 is formed on the inner surface of the horizontal open channel 450 or the vertical open channel 460 by patterning treatment, the cantilever 440 is preferably made of polymer material. Then, even if the several main bodies 400 are arranged adjacent to each other, electrical interference therebetween can be prevented.

Meanwhile, in the third embodiment, the main body 400 includes a cantilever 440, which has a nanoplate 442 and a nanotip 444 that is provided under the lower surface of a first end of the nanoplate 442. The main body 400 has a horizontal open channel 450, which extends from a chamber C that is formed in a second end of the nanoplate 442 to the first end of the nanoplate 442 along the upper surface of the nanoplate 442 so that fluid which is contained in the chamber C is moved to the first end of the nanoplate 442 through the horizontal open channel 450. The main body 400 further has a vertical closed channel 460' which is vertically formed through the nanotip 444 such that a first end thereof communicates with the horizontal open channel 450 and a second thereof extends to a pointed end 444a of the nanotip 444 so that the fluid that is moved to the first end of the nanoplate 442 is moved to the pointed end 444a of the nanotip 444 through the vertical closed channel 460'. The main body 400 further includes a first electrode 410 which is provided at at least one predetermined position for making electrical contact with fluid.

As shown in FIG. 14, in the cantilever 440 of the main body 400 according to the third embodiment, for example, the horizontal open channel 450 may be formed by forming a groove in the upper surface of the nanoplate 442 along the longitudinal center axis of the nanoplate 442. The vertical closed channel 460' may be formed by forming a vertical hole through the nanotip 444 such that the vertical hole of the nanotip 444 is connected to the groove the nanoplate 442.

The first electrode 410 is formed on the inner surfaces of the horizontal open channel 450 and the vertical closed channel 460' by patterning treatment. Here, the first electrode 410 may be formed in one selected from between the horizontal open channel 450 and the vertical closed channel 460'. Alternatively, the main body 400 may be made of conductive material and thus itself may be used as the first electrode 410.

In the case where the first electrode 410 is formed on the inner surface of the horizontal open channel 450 or the vertical closed channel 460' by patterning treatment, the cantilever 440 is preferably made of polymer material. Then, even if several main bodies 400 are arranged adjacent to each other, electrical interference therebetween can be prevented.

Furthermore, a hydrophobic film may be applied to the surface of the pointed end 444a of the nanotip 444. For example, a hydrophobic surface can be formed by oxygen plasma treatment or argon and oxygen ion beam treatment. As such, in the case where the hydrophobic film is applied to the surface of the end of the nozzle, when a droplet is jetted through the nozzle, the initial meniscus of fluid can be effectively formed. In addition, even if droplets are repeatedly jetted, the jetting operation can be reliably conducted and the performance thereof can be increased.

The main body 100 may be manufactured by a PCMS (polycimethylsiloxane) molding method.

Next, the second electrode 420 and the third electrode 430 will be explained below.

As shown in FIGS. 12 and 14, the second electrode 420 is provided between the pointed end 444a of the nanotip 444 and the printable matter A and has therein a through hole 420h, through which a droplet is jetted from the pointed end 444a of the nanotip 444 to the first surface of the printable matter A.

When the power supply 500 which will be explained in detail later supplies voltage applied between the second electrode 420 and the first electrode 410 of the main body 400, fluid that has been supplied into the chamber C is jetted through the pointed end 444a via the horizontal open channel 450 and the horizontal closed channel 460 or the horizontal open channel 450 and then printed onto the printable matter A after passing through the through hole 420h. In detail, when voltage is applied between the first electrode 410 and the second electrode 420, an electrostatic field is formed between the first electrode 410 and the second electrode 420, and Coulomb's force is applied to the fluid in the direction toward the second electrode 420 which is an opposite electrode. Hence, a droplet is jetted onto the printable matter A through the pointed end 444a.

Figure 13:
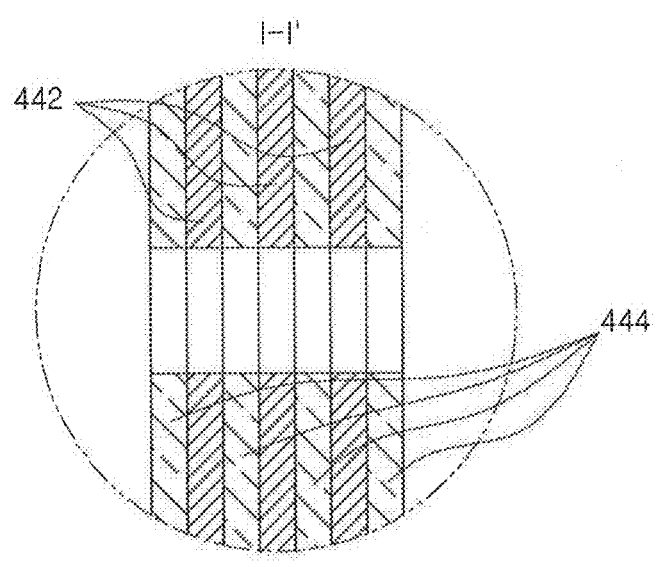
FIG. 13 is a sectional view taken along the line I-I' of FIG. 12.

Here, as shown in FIG. 13, the second electrode 420 is formed by alternately placing electrode layers 422 and insulation layers 424 on top of one another. Voltage which is applied between the first electrode 410 and each electrode layers 422 of the second electrode 420 can be individually controlled by the control unit 600. This will be explained in detail, in the description of the power supply 500 and the control unit 600.

Figure 15:
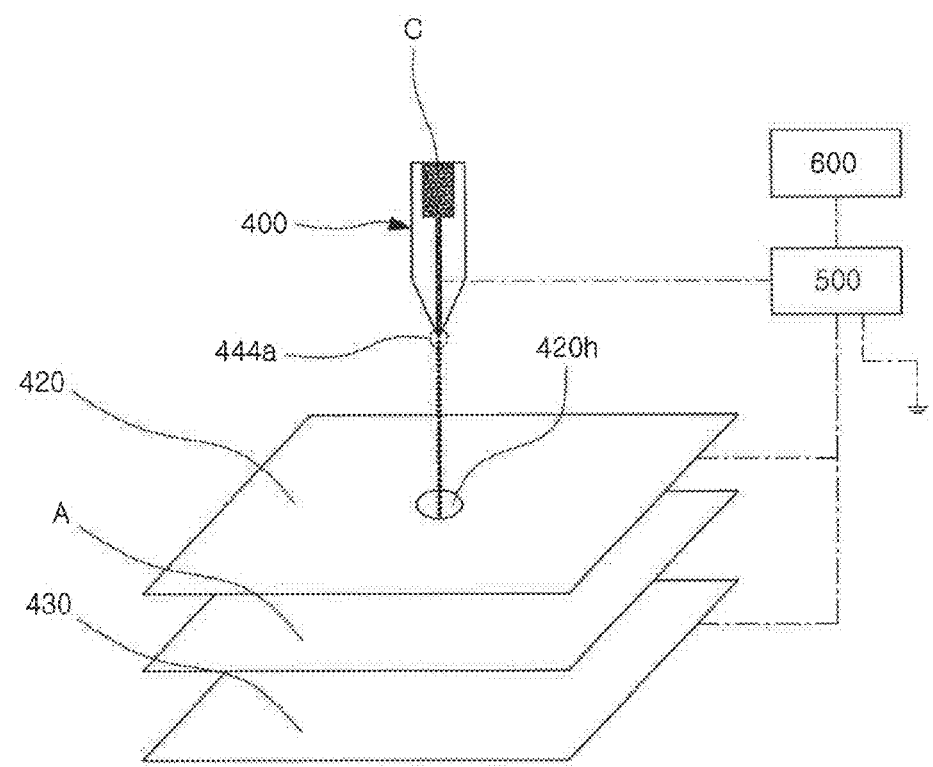
FIG. 15 is a view showing the concept of the apparatus for jetting a droplet using the nanotip according to the present invention.
Figure 16:
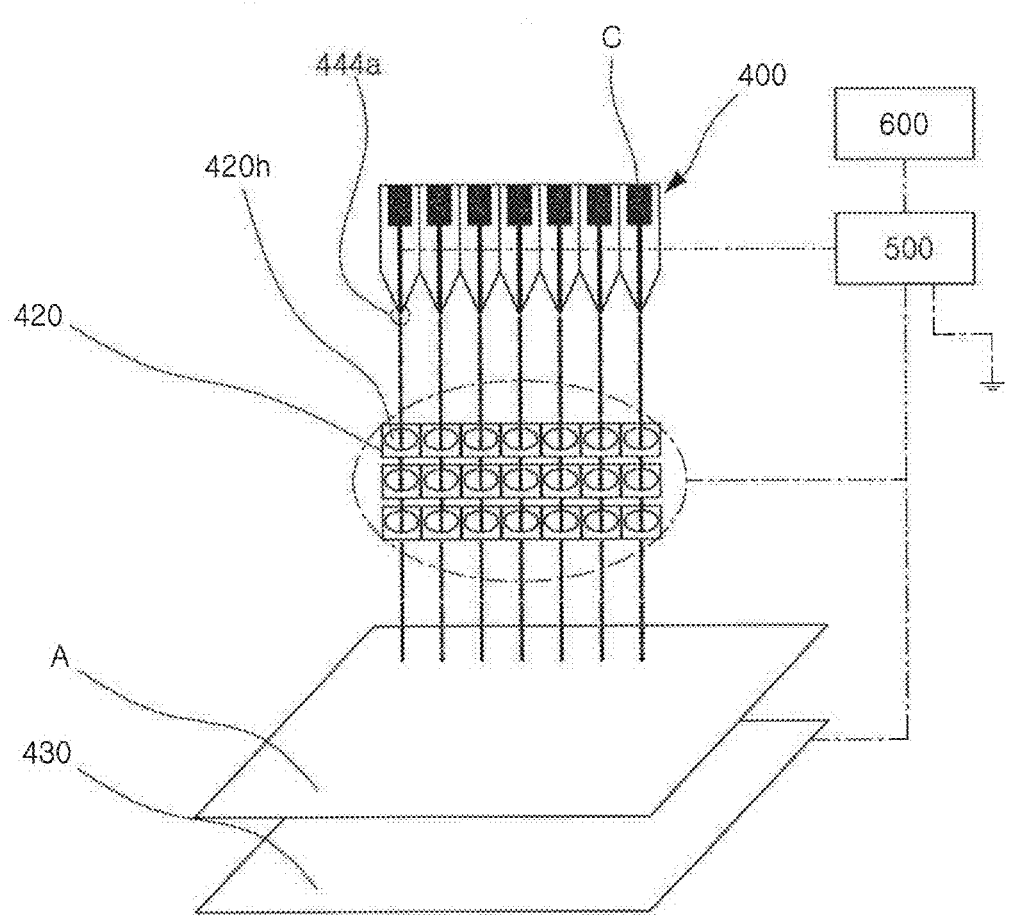
FIG. 16 is a view showing the concept of the integrated droplet jetting apparatuses using the nanotips according to the present invention.

Meanwhile, as shown in FIG. 15, in the case where a droplet is jetted from the single chamber C through the single pointed end 444a, the single through hole 420h is formed through the second electrode 420. As shown in FIG. 16, several main bodies 400 are arranged adjacent to each other to form an integrated structure, and second electrodes 420 are provided at positions corresponding to the pointed end 442 of the respective main bodies 400, such that voltage which is applied between the first electrode 410 and each second electrode 420 can be individually controlled.

As shown in FIGS. 12, 14, 15 and 16, the third electrode 430 is disposed at a position spaced apart from the second surface of the printable matter A by a predetermined distance. Voltage is also applied between the first electrode 410 and the third electrode 430. As such, because voltage is also applied between the first electrode 410 and the third electrode 430, Coulomb's force is further increased so that straightness of the trajectory of a jetted droplet can be further enhanced.

Below, the power supply 500 and the control unit 600 will be explained in detail.

As shown in FIGS. 12 and 14, the power supply 500 supplies voltage which is applied between the first electrode 410 and the second electrode 420 and between the first electrode 410 and the third electrode 430. The control unit 600 controls the power supply 500.

As stated above, the control unit 600 individually controls voltage applied between the first electrode 410 and each electrode layer 422. Furthermore, the control unit 600 can also independently control voltage applied between the first electrode 410 and the second electrode 420 and that applied between the first electrode 410 and each electrode layer 442.

For example, when voltage applied between the first electrode 410 and an electrode layer 442 disposed nearest to the pointed end 444a is different from voltage applied between the first electrode 410 and an electrode layer 142 disposed farthest from the pointed end 444a, the acceleration of jetted droplet can be positively or negatively influenced. Depending on variation in the acceleration of a jetted droplet, the quality of the print on the printable matter A is also varied.

Meanwhile, voltage applied between the first electrode 410 and the second electrode 420 may comprise one selected from among DC-pulse voltage, AC voltage or a combination of DC and AC voltage.

When electric charges are electrically charged on the interface of fluid by the application of consecutive signals of DC voltage and the electric charges move in the tangential direction of the interface, electrostatic force is concentrated on the central portion of the interface, thus jetting a droplet. However, because the interface and a jetting mode vary depending on the level of applied voltage and the electrical conductivity, the surface tension coefficient or the viscosity of fluid, if consecutive signals are applied, only under the restrictive condition that a single droplet is formed can droplets be formed and jetted.

To overcome this, if DC voltage is applied, because electrostatic force is applied to the interface of a droplet only for a limited time, a desired number of droplets can be formed and jetted at a desired point in time. In the case of a continuous jet or cone-jet, a droplet can also be formed by cutting the continuous jet. However, in even this case, to effectively form a droplet, conditions such as the applied voltage must be optimally given depending on the physical characteristics of the fluid. In other words, optimal voltage and frequency pulse must be applied depending on the characteristics of the fluid such that a desired number of droplets are formed at a desired point in time.

Meanwhile, according to recent research concerning electrospray, it is reported that the interface of fluid can also be changed by AC voltage. Therefore, in the second and third embodiments of the present invention, it is proposed to form and jet a droplet using AC voltage.

Moreover, to enhance the efficiency and effects of forming and jetting a droplet, preferably, DC voltage is applied within a range in which fluid is not sprayed or a droplet is not formed and, simultaneously, AC voltage of a special frequency is applied. Then, droplets can be formed and jetted a number of times proportional to the corresponding frequency, and more reliable optimal conditions can be given.

Figure 17:
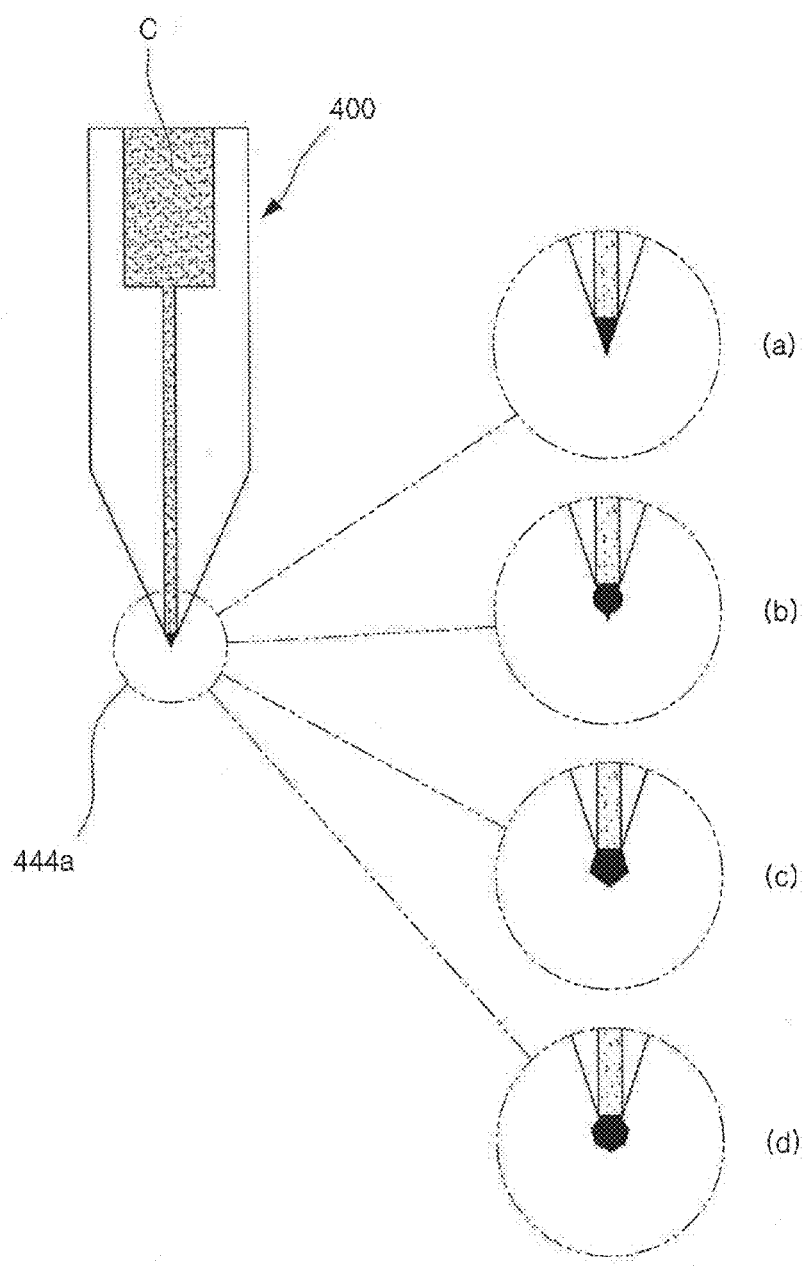
FIG. 17 is a view showing an interface of fluid formed on a pointed end of the nanotip of the droplet jetting apparatus according to the present invention.

FIG. 17 is a view showing an interface of fluid formed on the pointed end of the nanotip of the droplet jetting apparatus, according to the second or third embodiments of the present invention. As shown in (a), (b), (c) and (d), the interface of fluid may be formed into various shapes. The shapes shown in (a) or (b) are optimal.

Figure 18:
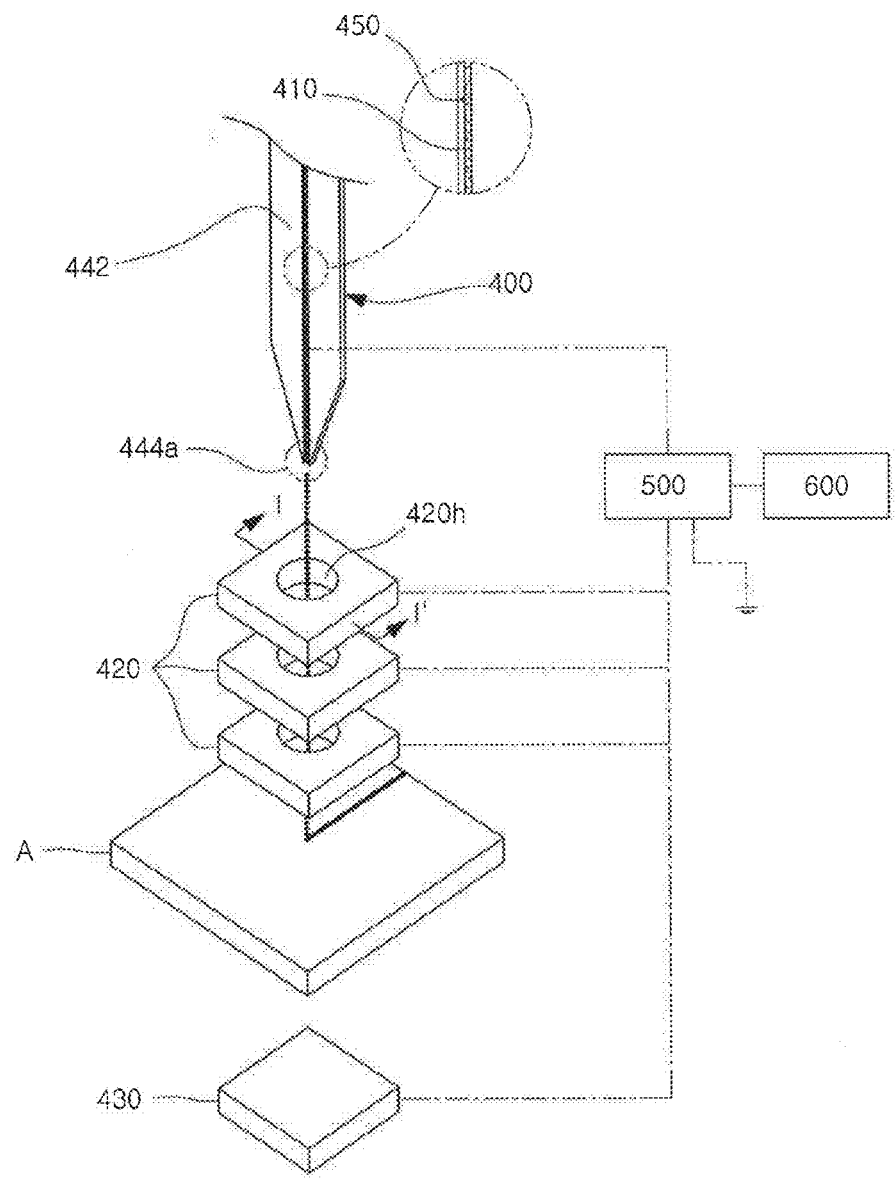
FIG. 18 is a view showing another embodiment of an apparatus for jetting a droplet using a nanotip according to the present invention.

Meanwhile, in place of the cantilever 440 including the nanoplate 442 and the nanotip 444 provided under the first end of the nanoplate 442 as shown in FIG. 18, a nanoplate 442 which has a pointed end 444a on an end thereof such that the width of the nanoplate 442 is reduced towards the end thereof may be used.

In other words, the other components, such as the second electrode 420, the power supply 500, the control unit 600, etc., remain the same as the second or third embodiment. Unlike the cantilever 440 of the second or third embodiment, the nanotip 444 is integrated with the nanoplate 442 and the pointed end 444a is formed by reducing the width of the end of the nanoplate 442. A droplet of fluid is jetted through the pointed end 444a formed on the nanoplate 442. In this case, the nanoplate 442 may be formed in either micro- or nanoscale.

Although the preferred embodiments of the present invention have been disclosed with reference the attached drawings for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the present invention provides a droplet jetting apparatus in which a controllable electrostatic field is applied to a surface of fluid jetted through a nozzle, so that the fluid can be jetted in a droplet shape without it undergoing a thermal change. Furthermore, jetted droplets can be precisely controlled using first, second and third electrodes.

In addition, according to an embodiment of the present invention, even though several droplet jetting apparatuses are disposed adjacent to each other at regular intervals, because the present invention is free from thermal problems which have been experienced with the conventional techniques, a highly integrated structure can be realized.

Meanwhile, in a droplet jetting apparatus using a nanotip according to the present invention, a controllable electrostatic field is applied to a surface of fluid jetted through a pointed end of a nanotip, so that the fluid can be jetted in a droplet shape without any accompanying thermal change. Furthermore, droplets to be jetted can be precisely controlled using first, second and third electrodes.

As well, according to an embodiment of the present invention, even though several droplet jetting apparatuses using nanotips be disposed adjacent to each other at regular intervals, because the present invention is free from thermal problems which have been experienced with the conventional techniques, a highly integrated structure can be realized.

The invention claimed is:

1. An apparatus for jetting a droplet using a nanotip a first surface of a printable matter, comprising:
    a main body including; a cantilever having a nanoplate and a nanotip provided under a lower surface of a first end of the nanoplate; a horizontal open channel extending from a chamber, formed in a second end of the nanoplate, to the first end of the nanoplate along an upper surface of the nanoplate so that fluid contained in the chamber is moved to the first end of the nanoplate through the horizontal open channel; a vertical open channel formed in one surface of the nanotip such that a first end thereof communicates with the horizontal open channel and a second end thereof extends to a pointed end of the nanotip so that the fluid that is moved to the first end of the nanoplate is moved to the pointed end of the nanotip through the vertical open channel; and a first electrode provided on at least one predetermined portion to make electrical contact with the fluid;
    a second electrode provided between the pointed end of the nanotip and the printable matter, the second electrode having therein a through hole, through which a droplet of the fluid is jetted from the pointed end onto the first surface of the printable matter;
    a power supply to supply a voltage to be applied between the first electrode and the second electrode; and
    a control unit to control the power supply.

2. The apparatus according to claim 1, further comprising:
    a third electrode disposed at a position spaced apart from a second surface of the printable matter by a predetermined distance.

3. The apparatus according to claim 2, wherein the power supply supplies a voltage to be applied between the first electrode and the third electrode.

4. The apparatus according to claim 1, wherein the second electrode is formed by alternately placing electrode layers and insulation layers on top of one another.

5. The apparatus according to claim 4, wherein the control unit individually controls a voltage applied between the first electrode and each of the electrode layers of the second electrode.

6. The apparatus according to claim 1, wherein the voltage applied between the first electrode and the second electrode comprises one selected from among a DC-pulse voltage, an AC voltage and a combination of a DC voltage and an AC voltage.

7. The apparatus according to claim 1, wherein a hydrophobic film is applied to a surface of the pointed end of the nanotip.

8. The apparatus according to claim 1, wherein the cantilever is made of a polymer material.

9. An apparatus for jetting a droplet using a nanotip onto a first surface of a printable matter, comprising:
    a main body including: a cantilever having a nanoplate and a nanotip provided under a lower surface of a first end of the nanoplate; a horizontal open channel extending from a chamber, formed in a second end of the nanoplate, to the first end of the nanoplate along an upper surface of the nanoplate so that fluid contained in the chamber is moved to the first end of the nanoplate through the horizontal open channel; a vertical closed channel formed through the nanotip in a vertical direction such that a first end thereof communicates with the horizontal open channel and a second end thereof extends to a pointed end of the nanotip so that the fluid that is moved to the first end of the nanoplate is moved to the pointed end of the nanotip through the vertical closed channel; and a first electrode provided on at least one predetermined portion for making electrical contact with the fluid;
    a second electrode provided between the pointed end of the nanotip and the printable matter, the second electrode having therein a through hole, through which a droplet of the fluid is jetted from the pointed end onto the first surface of the printable matter;
    a power supply to supply a voltage to be applied between the first electrode and the second electrode; and
    a control unit to control the power supply.

10. The apparatus according to claim 9, further comprising:
    a third electrode disposed at a position spaced apart from a second surface of the printable matter by a predetermined distance.

11. The apparatus according to claim 10, wherein the power supply supplies a voltage to be applied between the first electrode and the third electrode.

12. The apparatus according to claim 9, wherein the second electrode is formed by alternately placing electrode layers and insulation layers on top of one another.

13. The apparatus according to claim 12, wherein the control unit individually controls a voltage applied between the first electrode and each of the electrode layers of the second electrode.

14. The apparatus according to claim 9, wherein the voltage applied between the first electrode and the second electrode comprises one selected from among a DC-pulse voltage, an AC voltage and a combination of a DC voltage and an AC voltage.

15. The apparatus according to claim 9, wherein a hydrophobic film is applied to a surface of the pointed end of the nanotip.

16. The apparatus according to claim 9, wherein the cantilever is made of a polymer material.

17. The apparatus according to claim 9, wherein the main body comprises a plurality of main bodies provided adjacent to each other to form an integrated structure, and the second electrode is provided between the printable matter and the pointed ends of the main bodies, with through holes formed in the second electrode at respective positions corresponding to the pointed ends of the main bodies.

18. An apparatus for jetting a droplet using a nanotip onto a first surface of a printable matter, comprising:

a main body including: a nanoplate having a pointed end formed by reducing a width of a first end of the nanoplate; a horizontal open channel extending from a chamber, formed in a second end of the nanoplate, to the first end of the nanoplate along an upper surface of the nanoplate so that fluid contained in the chamber is moved to the pointed end of the first end of the nanoplate through the horizontal open channel; and a first electrode provided on a portion of the horizontal open channel for making electrical contact with the fluid;

a second electrode provided between the pointed end of the nanoplate and the printable matter, the second electrode having therein a through hole, through which a droplet of the fluid is jetted from the pointed end of the nanoplate onto the first surface of the printable matter;

a power supply to supply a voltage to be applied between the first electrode and the second electrode; and a control unit to control the power supply.

19. The apparatus according to claim 18, further comprising:

a third electrode disposed at a position spaced apart from a second surface of the printable matter by a predetermined distance.

20. The apparatus according to claim 19, wherein the power supply supplies a voltage to be applied between the first electrode and the third electrode.

21. The apparatus according to claim 18, wherein the second electrode is formed by alternately placing electrode layers and insulation layers on top of one another.

22. The apparatus according to claim 21, wherein the control unit individually controls a voltage applied between the first electrode and each of the electrode layers of the second electrode.

23. The apparatus according to claim 18, wherein the voltage applied between the first electrode and the second electrode comprises one selected from among a DC-pulse voltage, an AC voltage and a combination of a DC voltage and an AC voltage.

24. The apparatus according to claim 18, wherein a hydrophobic film is applied to a surface of the pointed end of the nanoplate.

25. The apparatus according to claim 18, wherein the nanoplate is made of a polymer material.

26. The apparatus according to claim 18, wherein the nanoplate comprises a plurality of nanoplates provided adjacent to each other to form an integrated structure, and the second electrode is provided between the printable matter and the pointed ends of the nanoplates, with through holes formed in the second electrode at respective positions corresponding to the pointed ends of the nanoplates.

* * * * *

UNITED STATES PATENT AND TRADEMARK OFFICE
CERTIFICATE OF CORRECTION

| | | |
|---|---|---|
| PATENT NO. | : 8,888,249 B2 | Page 1 of 1 |
| APPLICATION NO. | : 14/147637 | |
| DATED | : November 18, 2014 | |
| INVENTOR(S) | : Do Young Byun, Ji Hoon Kim and Si Bui Quang Tran | |

It is certified that error appears in the above-identified patent and that said Letters Patent is hereby corrected as shown below:

In the Claims

Claim 1 (column 15, line 23)

"1. An apparatus for jetting a droplet using a nanotip a first..." should read --1. An apparatus for jetting a droplet using a nanotip onto a first...--

Claim 1 (column 15, line 24)

"...surface of a printable matter, comprising;..." should read --...surface of a printable matter, comprising:...--

Claim 1 (column 15, line 25)

"...a main body including; a cantilever having a nanoplate and..." should read --...a main body including: a cantilever having a nanoplate and...--

Signed and Sealed this
Fourteenth Day of July, 2015

Michelle K. Lee
*Director of the United States Patent and Trademark Office*